United States Patent [19]

Saam

[11] Patent Number: 5,058,709
[45] Date of Patent: Oct. 22, 1991

[54] DEVICE FOR THE DOSING OF LUBRICANTS

[75] Inventor: Werner Saam, Oberhausen-Rheinhausen, Fed. Rep. of Germany

[73] Assignee: Joseph Vogele AG, Mannheim, Fed. Rep. of Germany

[21] Appl. No.: 535,151

[22] Filed: Jun. 8, 1990

[30] Foreign Application Priority Data

Jun. 9, 1989 [DE] Fed. Rep. of Germany ....... 3918925

[51] Int. Cl.$^5$ ............................................. F01M 1/18
[52] U.S. Cl. .................................. 184/108; 184/7.4; 73/261
[58] Field of Search ......................... 184/7.4, 6.4, 108; 73/253, 261

[56] References Cited

U.S. PATENT DOCUMENTS

| 3,224,274 | 12/1965 | Silvern | 73/261 |
| 3,381,776 | 5/1968 | Gruber et al. | 184/7.4 |
| 4,467,892 | 8/1984 | Van de Bogert | 184/7.4 |
| 4,579,008 | 4/1986 | Böhm et al. | 73/261 |
| 4,641,522 | 2/1987 | Lopresti | 73/261 |

FOREIGN PATENT DOCUMENTS

| 2824353 | 1/1979 | Fed. Rep. of Germany . | |
| 2943184A1 | 5/1981 | Fed. Rep. of Germany . | |
| 3511537A1 | 10/1986 | Fed. Rep. of Germany . | |
| 0073624 | 5/1982 | Japan | 73/261 |

OTHER PUBLICATIONS

No. 1, 80.03.86, Eugen Woerner GmbH & Co., D-6980 Wertheim, 3-18-86.
Durchflussmesser, 48715 PB1 of the De Limon Fluhme GmbH & Co., D-4000 Duesseldorf 1, 1982.

Primary Examiner—Ira S. Lazarus
Assistant Examiner—Alan B. Cariaso
Attorney, Agent, or Firm—Finnegan, Henderson, Farabow, Garrett & Dunner

[57] ABSTRACT

In a device for the dosing of lubricants which comprises at least one manual throttling element limiting the volume flow and a flow metering device connected downstream of it, which contains at least one sensor element movable through the volume flow, a dynamic flow metering means (M) is connected downstream in the manual throttling element (D) whose sensor element (S) moves also after the reaching of the nominal volume flow and a display means (A) is provided on the dynamic flow metering device (M), which represents the actual volume flow from the movement of the sensor element (S).

12 Claims, 2 Drawing Sheets

DEVICE FOR THE DOSING OF LUBRICANTS

BACKGROUND

1. Field of the Invention

The present invention relates to apparatus for supplying measured doses of lubricants to a lubricating line. In particular, the present invention relates to devices for dosing lubricants to a lubricating line wherein the devices of the type having at least one manual throttling element limiting the volume flow of the lubricant into the lubricating line.

2. Description of the Prior Art

Such dosing devices with manual throttling element are used for specific central lubrication tasks in the parallel distribution of lubricant flows depending upon the requirements of the machine manufacturers or operators. The manual adjustability of the manual throttling element is necessary in practice to reduce the volume flow for a specific period of time in the case of cold, highly viscous lubricants and to prevent an overflow of lubricating points in the case of a reflux which is still deficient due to the viscosity. A machine-load-dependent lubricant dosing is adjusted in each case in a relatively simple fashion. Relatively large volume flows up to about 6 1/min. are dosed to the lubricating points in body presses, large transmissions and paper machines.

In the dosing device known from the print sheet No. 01 80.03.86 of Eugen Woerner GmbH & Co., D-6980 Wertheim the flow metering device is an inspection pipe with a floating piston as sensor element, whose position determined by the volume flow is electrically monitored. The boundary values of the volume flow are entered on a scale. An LED display serves for the function control by indicating whether the floating piston has reached or exceeded a previously determined position in the inspection pipe.

The, dosing device according to the publication "Durchflußmesser", 48715 PB1 of the DE LIMON FLUHME GmbH & Co. company, D-4000 Düsseldorf 1 works according to the same principle, an electric switching contact being actuated as a function of the position of the floating body.

These dosing devices work in a strongly viscosity-dependent fashion, i.e. they must be calibrated at a specific lubricant temperature. Static flow metering devices are concerned since the floating body remains immovable under the adjusted volume flow during operation. Several disadvantages result from this. Due to impurities contained in the lubricant and substances deposited e.g. due to the additives under thermal and mechanical load, the inspection pipe becomes clogged. A direct visual control of the position of the floating body is rendered difficult or even impossible after a longer service life. The floating body often remaining immovable for weeks gets caught due to such deposits and delivers then an "erroneous" "okay" message despite a changing volume flow. These impurities change the flow cross-sections near the floating body so that it changes its position and generates a "erroneous" fault signal, although the volume flow is correct or still within an admissible tolerance range or generates an "erroneous" "okay" signal although the volume flow is no longer correct. A serious disadvantage of these static flow metering devices is moreover the incorrect display of the volume flow and the difficult exact calibration. This is also due to the fact that the floating body only indicates whether the nominal volume flow has been reached or not reached or exceeded. In lubricating systems in which such relatively inexpensive throttling dosing devices which are easy to handle are used, this has been put up with so far as being inevitable and it was attempted by means of frequent controls and knocking against the inspection pipe to ensure a proper function and to avoid damages in the lubricating points. Therefore it has become a custom to let supervisors control all dosing devices practically daily although the adjusted volume flow is not changed for weeks or months.

Dynamic flow metering devices are known per se. According to DE-OS 29 43 184 a flow metering cell for a flowing liquid contains a gearwheel or an impeller, whose rotational speed is inductively scanned to detect the actual flow. The wheel may consist of plastic material and be equipped with permanent magnets. This principle is not suited for relatively viscous lubricants. An oval wheel meter serving as flow counter with an electric pulse transmitter on a wheel serves for determining the oil consumption of an oil burner according to DE-OS 35 11 537.

SUMMARY OF THE INVENTION

The invention is based on the object of creating a device of the type mentioned at the beginning which distinguishes itself by an increased operational reliability and a greater accuracy of dosing maintaining the advantage of constant manual adjustability and direct control at the adjustment point.

In accordance with the present invention as embodied and broadly described herein, a device as a constructional unit for the dosing of lubricants to at least one lubricating point connected to a throttling line comprises at least one manual throttling element limiting the volume flow to the lubricating point and a flow metering device connected downstream of the manual throttling element. The flow metering device contains at least one sensor element movable through the volume flow. The flow metering device is a dynamic flow metering device connected downstream of the manual throttling element and whose sensor element also moves during constant volume flow. The device further includes a display device showing the actual volume flow from the movement of the sensor element.

The dynamic flow metering device of the present invention which will be described in more detail hereinafter works with a self-cleaning effect, because movements of the sensor element take place even in the case of a volume flow remaining unchanged in the flow metering device, which prevent the depositing of impurities and the partial clogging of the flow metering device. The respective actual volume flow is exactly indicated from the movement of the sensor element. If a foreign matter gets into the dynamic flow metering device, it can possibly block or decelerate it, which is, however, immediately indicated. There is neither a "erroneous" "okay" display nor a "erroneous" fault display. This increases operational reliability, because it is definite at all times that the actual volume flow is correctly displayed in the case of all conditions, i.e. also in the case of failures, which excludes an erroneous alarm as well as uncertainties due to "erroneous" "okay" messages. Since the display means in the constructional unit permanently keeps on hold an indication derived from the dynamics of the sensor element so-to-speak on site, the volume flow can be directly controlled more exactly at the adjustment element of the manual throttling element and is above all displayed more correctly than in a static flow metering device, which depends on a static position depending on many influences. The robust and inexpensive device which is actually simple due to the manual throttlling element becomes a precise device for such high requirements due to the dynamic flow metering device, the fulfilling of which has only been possible so far with substantially more expensive apparatus structures, such as an expensive and sensitive flow limiter. Nevertheless, the device maintains the advantage of simple construction and adjustability at all times, because, strictly speaking, intervention is only carried out on the monitoring side and the accuracy and reliability of the monitoring of the effected adjustment is increased. The dynamic flow metering device has furthermore the important advantage of working largely viscosity-independent as opposed to static flow metering devices which work in an extremely viscosity-dependent fashion and can only be correctly adjusted to a certain extent in the case of the actual operating temperature of the lubricant and which do not longer display correctly in the case of changes in the temperature.

It is certainly known in lubricant technology to use relatively expensive flow limiters working proportionally in exacting lubricating problems. Each flow limiter is alone responsible for adjusting and observing the volume flow. A dynamic flow metering device can be connected downstream of these flow limiters, which is connected to a central measuring station. In the measuring station a function control is associated to each dynamic flow metering device and possibly even a display or comparator means. A direct visual control on site and on the dynamic flow metering device is only possible by means of visual control of the movement of the sensor element. However, the visual control only confirms the flowing of a volume flow without giving information on its actual dimensions. For this reason dynamic flow metering devices have so far only been used in lubricating technology in connection with flow limiters such as in DE-OS 28 24 353, in which a volume controlling valve separated from the dynamic flow metering device designed as gearwheel motor is provided as flow limiter and the actual amount is displayed via a transmission from a separately disposed display means.

Preferably, the dynamic flow metering device is a gear wheel motor with two permanently engaged spur wheels whose engagement area is in a measuring chamber and that the flow path for the volume flow extends in tangential direction of the spur wheels through the engagement area. The spur wheels being in engagement are already driven in the case of small volume flows so that the exact indication of the actual volume flow can be read. Each adjustment of the manual throttling element can be immediately read on the display means so that an exact adaption to the nominal volume flow becomes possible. If a foreign matter gets into the engagement area of the spur wheels, their movement is hindered or blocked, which ensues in an fault signal. In the case of a volume flow being unchanged for a long period of time the spur wheels produce a desirable self-cleaning effect, which eliminates the susceptibility to failures due to deposited impurities. If deposits narrow the passage, this is also displayed immediately. If the spur wheels are blocked then the fit ensured by the backlash of the teeth and the mobility of the gearwheels in the measuring chamber is sufficient for an emergency running, although there is already a failure display. The difference in pressure produced by the spur wheels is negligible and does not have any noticeable influence on the uniform supply of the luburicating point. The manual throttling element alone is responsible for adjusting and observing the volume flow. Since the gearwheels convey exactly predetermined individual volumes during their movement, which are exactly counted, the display is extremely accurate. Changes in the viscosity caused by the temperature do not have any noticeable influence on the accuracy of the display, because the same volumes are always conveyed. The display is always correct independently of the temperature of the lubricant.

It is also preferred that at least one permanent magnet is contained in at least one of the spur wheels, that a scanning means is provided with at least one scanning element aligned to the circumferential path of the permanent magnet, and that the scanning means is connected to the display means via an evaluator circuit. The gearwheel motor has here the function of a drive for the permanent magnets, whose movement is ascertained by the scanning means and can be converted to a display value representing the actual volume flow via the evaluator circuit. The conversion of the movement of the spur wheels can be effected both digitally or analoguely. The useful signals from the rotating movement of two oppositely polarized permanent magnets are exact and can be well processed to exactly indicate the volume flow. Not only each change of the volume flow is displayed, but also a volume flow being constant over long service lives.

It is still further preferred that the scanning means, the evaluator circuit, and the display means are disposed on the housing of the gear wheel motor and that a separate power supply for the scanning means, the evaluator circuit, and the display means is provided, and also that the display means is operatively connected in signal-transmitting relationship to an external measuring station. The display means can contain an LCD or LED display. The additional connection to the measuring station permits a remote control of the dosing device, although it displays failures in clearly visible fashion at all times for a direct control and represents the volume flow, which is required for the correct adjustment by means of the manual throttling element. The LCD or LED displays work reliably and insusceptibly to failures over long service lives with low energy requirements.

It is also preferred that the display means includes an alarm signal transmitter. This is furthermore important because the alarm signal transmitter displays failures which can then be eliminated immediately. A daily visual or knock control of the dosing device is superfluous, because the control persons can rely on the precision of the dynamic flow metering devices, since they are insusceptible to failures due to impurities or foreign matter inasmuch as they exactly display failures and to not emit any erroneous fault signals or erroneous "okay" signals.

And it is yet still further preferred that a plurality of dynamic flow metering devices are disposed in group-like fashion on a joint base plate containing a lubricant supply line and branch connections to lubricating lines so that the displays of the display means are at the same side, preferably the side of the manual throttling elements. At least one adjustable manual throttling element is disposed in the base plate between the lubricant supply line and each branch connection. The manual throttling element can be built into the housing of the gear wheel motor, and the scanning means, the evaluator circuit, and the display means can be disposed on the housing as an exchangeable module. The multiple device feature is significant in that a minimum of space need be utilized to monitor a lubricant flowing to several different lines. These features are furthermore important because the modular construction is advantageous in view of repairs or maintenance work and corresponds to modern construction concepts. The monitoring system of each dosing device is independently designed in customary fashion so that it emits an alarm signal during a failure, the display means possibly working with a failure coding, so that the respectively occurred failure is displayed and can be rapidly eliminated. If a failure occurred for instance in one of the components of the dosing device, e.g. a mechanical defect in the gearwheelmotor or a shortcircuit in one of the electrical or electronic components, then the faulty component can be rapidly replaced as a modular component. Here, as well, the dynamic flow metering device can bring to bear its characteristic given due to the dynamics to be able to differentiate between different failure causes.

BRIEF DESCRIPTION OF THE DRAWINGS

An embodiment of the subject matter of the invention is explained by means of the drawing.

DESCRIPTION OF THE PREFERRED EMBODIMENTS

Figure 1:
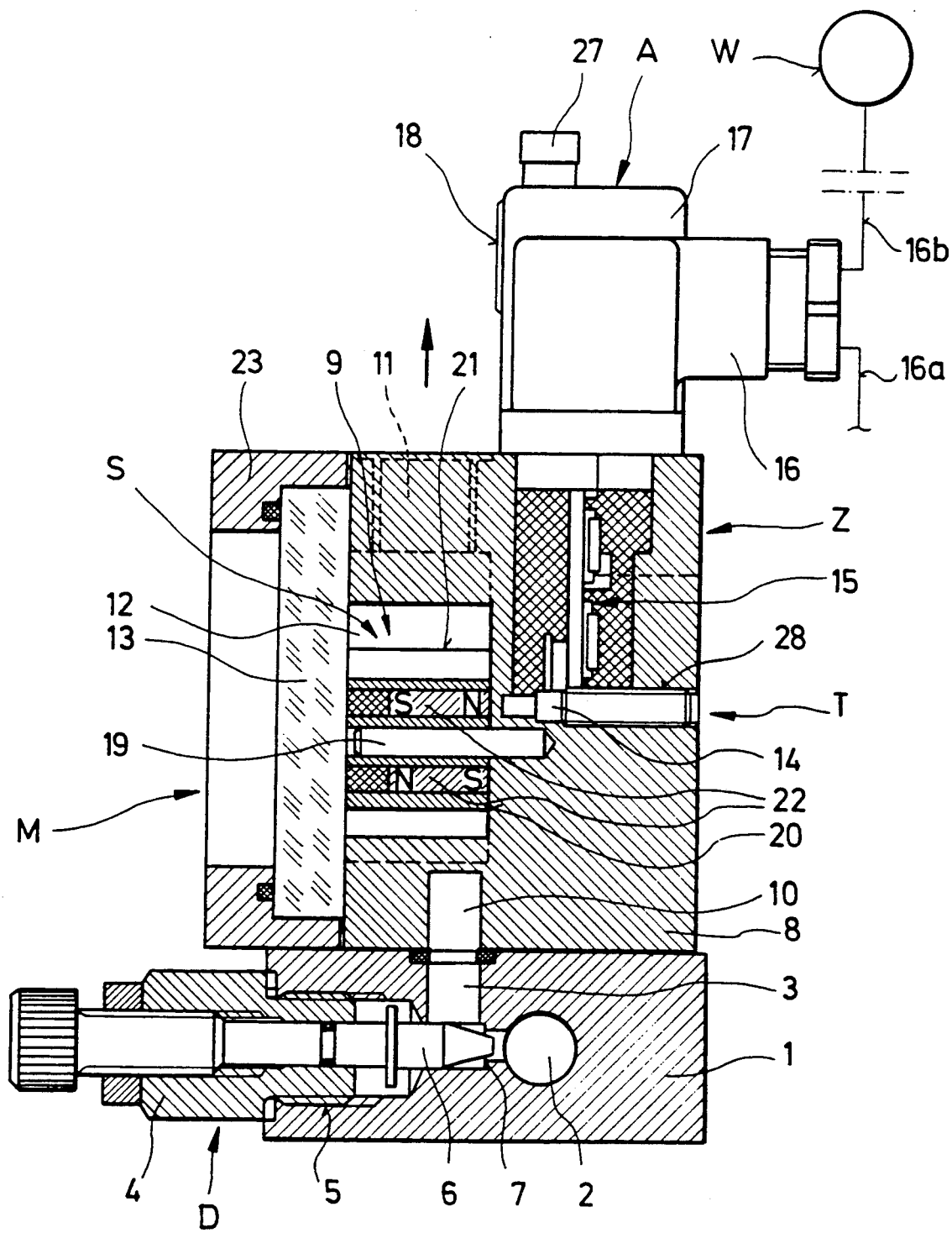
FIG. 1 shows a section through a dosing device and FIG. 2 shows a front view of a dosing device group with outlined sectional plane.
Figure 2:
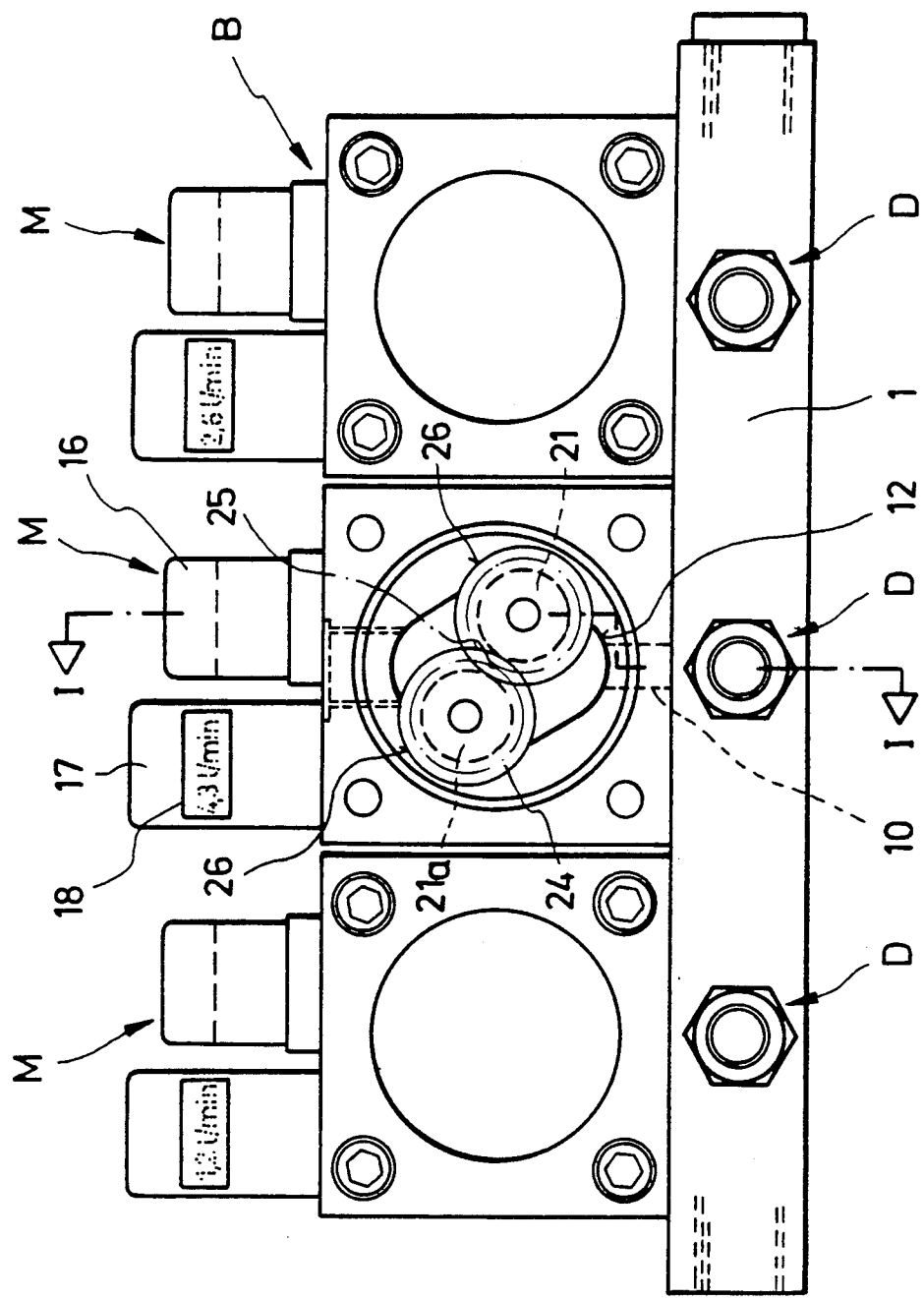

For the parallel distribution of large volume flows of lubricant a group B of dosing devices Z for at least one lubricating point in each case is provided according to FIGS. 1 and 2, each dosing device Z representing a constructional unit of its own in the group B. A manual throttling element D serves for adjusting the volume flow, to which a dynamic, optoelectronic flow metering device M is connected downstream in the direction of flow. At least one sensor element S is provided in the flow metering device M, which can be moved through the volume flow of lubricant. A scanning means T is associated to the sensor element S, which is connected to a display means A via an evaluator circuit 15.

In a base plate 1 common to all provided dosing devices Z, which contains a central supply line 2, several branch lines 3 fork of from the same. The inflow to each branch line 3 is adjusted by the manual throttling element D. It has a locking screw 4 for the throttling element 6, which is screwed into a threaded bore 5, which cooperates in customary fashion with a receiver 7. An axial screwing of the throttling element 6 effects a change of the throttle cross-section and thus of the volume flow in the lubricating line.

A housing 8 of the dynamic flow metering device M which is allocated to the manual throttling element D is screwed onto the base plate 1. A gearwheel motor 9 with two permanently engaging spur wheels 21, 21a is provided in a measuring chamber 12 in the housing 8. A connection 10 leads from the branch line 3 to the measuring chamber 12. A connection 11 serves for connecting the lubricating line. The connection 11 could also end in the base plate 1, to which the lubricating line is then connected. At the inspection side of the flow metering device M the measuring chamber 12 is closed by an inspection glass 13 which is sealingly fixed to the housing 8 by means of a retaining ring 23. A scanning element 14 is held in a housing bore 28 which extends in parallel to the rotational axis of the two spur wheels 21, 21a, which is part of the scanning means T. The scanning element 14 is in a signal-transmitting connection with the evaluator circuit 15, which is built into the housing 8, which is supplied with current via a line 16a and a plug 16. The evaluator circuit 15 is furthermore in signal-transmitting connection with the display means A, which has a display 18 (LED or LCD display) at the inspection side of the inspection glass 13 of the housing 8. The evaluator circuit 15 or the display means A is connected with a measuring station W locally separated from the dosing means Z via a line 16b.

The spur wheels 21, 21a are rotatably mounted in the bottom 20 with plug-type axles 19. The spur wheel 21 serves as a driving element for diametrally opposite axis-parallel permanent magnets 22 with opposite polarities. The scanning element 14 is aligned to their orbits. Several scanning elements may also be provided for a higher resolution.

The spur wheels 21, 21a support a radial toothing 24 and have a joint engagement area 25 approximately in the centre of the measuring chamber 12, through which the volume flow flows from the connection 10 to the connection 11 approximately tangentially to both spur wheels 21, 21a. The measuring chamber 12 has an approximately kidney-shaped contour with two opposite swells 26, into wich part of the circumference of each spur wheel 21, 21a is fitted with small backlash. The inspection glass 13 and the bottom 20 of the measuring chamber 12 are in alignment with the front sides of the two spur wheels 21, 21a so that the lubricant is forced to flow to the engagement area 25. Since the pressure reduction by means of the swells 26 is effected in a different fashion than via the meshing teeth in the engagement area 25, the gearwheel motor 9 is driven in such fashion in FIG. 2 that the lower spur wheel 21 is rotated clockwise and the upper spur wheel 21a is rotated counter-clockwise. The scanning element 14 is suitably a Hall sensor which is activated as a function of the rotational speed of the spur wheels 21, 21a and emits useful signals. The signals are processed in the evaluator circuit 15. The display on the actual volume flow appears constantly in the display field 18 of the display means A. The signals of the evaluator circuit 15 or also of the Hall sensor 14 can be transmitted to the measuring station W via line 16b. The actual condition is continuously represented and compared with a nominal value for all partial volume flows in the measuring station.

A signal transmitter 27 is mounted on the display means A, which is either activated from the measuring station W or via the evaluator circuit even in the case of a failure, e.g. in the case of an inadmissible exceeding of or dropping below the nominal volume flow. The display means A could also work with an failure coding, by means of which the respective cause of the failure is displayed in coded form. For this purpose the evaluator circuit 15 could be equipped with a comparator, which can be adjusted at the dosing device Z by inputting parameters when required.

The display means A could be built into the housing 8. It is furthermore conceivable to build the manual throttling element D also into the housing and to design the individual components, i.e. both the manual throttling element, the scanning means T, the evaluator circuit 15 and the display means A as modules which can be exchanged, if required. As a further possibility the base plate 1 could be divided into sectors, one sector each being integrated into the housing 8. Then, too, the group-like joining of several dosing devices on a minimum of space is possible. Nevertheless, the possibility is preserved to check each dosing device optically already by a glance to the inspection glass 14 as regards function and by a glance to the display 18 as regards the volume flow. Upon the adjustment of the manual throttling element D, it can be immediately detected at all times on the display 18 how the volume flow is changed. This is suitable if e.g. during the starting phase of a machine an overflooding of the lubricating points must be avoided in the case of a viscosity-inherent and still deficient reflux of the lubricant or if an adaptation to the machine load is effected in the case of a machine-load-dependent dosing changing the volume necessary for normal operation. The manual throttling element D could also be composed for a coarse and a fine throttle.

The spur wheels 21, 21a consist suitably of a non-magnetic material, e.g. a plastic material, which is dimensionally stable and resistant against the lubricant and has good endurance run properties. Due to the running movement of the two spur wheels 21, 21a the inspection glass 13 is automatically freed from impurities settling from the lubricant. Thermally highly loaded lubricants such as oils tend to deposit additives or impurities resulting from the reaction between additives and other substances in the case of long service lives. These deposits can narrow the flow ducts in the extreme case. The gearwheel motor 9 is insusceptible to such influences and works independently of viscosity in a desirable fashion. Several gearwheel motors may also be accommodated in one and the same housing. Since the display 18 anyhow displays the proper function of the gearwheel motor besides the exact indication of the actual volume flow, the inspection glass could be omitted and the housing could be designed in closed fashion, which possibly ensues in production-technique advantages.

What is claimed is:

1. A device for dosing lubricant to at least one lubricating point connected to a lubricating line, the device comprising a constructional unit having at least one adjustable manual throttling element for adjustment of the volume flow of lubricant to the lubricating point, and a flow metering device being located downstream of said throttling element, said flow metering device further comprising at least one sensor element being moveable by the volume flow through said flow metering device,
 a) wherein said flow metering device in a dynamic flow metering device including a gear wheel motor having a housing defining a measurement chamber with an engagement area, two spur wheels enclosed by said housing and permanently engagingly meshing in said engagement area, a flow path for the volume flow extending in tangential direction of both spur wheels throughout the engagement area so that both spur wheels are caused to rotate by the lubricant even in the case of a constant volume flow, and
 b) wherein at said flow metering device within said constructional unit a display means is provided for showing the measured lubricant volume flow rate, said constructional device further including means interconnected to said display means for sensing the rotation of said spur wheels, said volume flow rate being derived from the sensed rotation of said spur wheels.

2. The device according to claim 1, wherein said sensing means includes at least one permanent magnet in at least one of said spur wheels, and wherein a scanning means is provided having at least one scanning element being aligned with the rotation path of said permanent magnet, and wherein an evaluator circuit connects said scanning means to the display means.

3. The device according to claim 2, wherein said scanning means, said evaluator circuit and said display means are integrated in said housing.

4. The device according to claim 2, wherein a separate power supply is provided for said scanning means, said evaluator circuit, and said display means, and wherein said sensing means is operatively connectable in signal-transmitting fashion to an external measuring station.

5. The device according to claim 1, wherein said display means contains one or more display elements selected from the group consisting of LCD and LED displays.

6. The device according to claim 2, wherein said display means includes an alarm signal transmitter.

7. The device according to claim 1, wherein the device supplies a plurality of lubricating lines, the device further comprising a common base plate having a lubricating supply line and branch connections to said lubricating lines provided therein, a plurality of said gear wheel motors arranged on said base plate in group-like fashion, and a plurality of display means, wherein said plurality of display means are all located on the same side of the device.

8. The device according to claim 7, wherein at least one adjustable manual throttling element is located in said base plate between the lubricant supply line and each branch connection.

9. The device according to claim 3, wherein said manual throttling element is built into said gear wheel motor housing.

10. The device according to claim 3, wherein said scanning means, said evaluator circuit, and said display element are integrated in said housing as exchangeable modules.

11. The device according to claim 2 wherein two diametrically opposed permanent magnets are provided on said at least one spur wheel.

12. Apparatus for dosing liquid lubricant to at least one lubricant point in a lubricating line, the apparatus comprising:
 a unit assembly having an inlet connectable to a lubricant source under pressure, an outlet connectable to the lubricating line at the lubricating point, and an internal lubricant flow path therebetween, said unit assembly further comprising:
 a) manually adjustable liquid throttling means positioned in said flow path for controlling the flow rate of all the lubricant flow along said flow path; and
 b) dynamic flow metering means positioned in said flow path downstream of said manually adjustable throttling element for sensing lubricant volumetric flow rate along said flow path,
 wherein said dynamic flow metering means includes a gear wheel motor having a chamber and two spur wheels in meshing engagement therein, said chamber having an entrance area for receiving all the lubricant flowing along said flow path, an engagement area wherein the received lubricant flows tangentially between said spur wheels causing positive rotation thereof, and an exit area for releasing the received and engaged lubricant along said flow path; and c) display means positioned proximate said manually adjustable throttling element and operatively connected to said gear motor for displaying said released lubricant volume flow rate.

* * * * *